Nov. 18, 1952 — E. W. COWAN — 2,618,766
IMPULSE COUNTER
Filed Dec. 18, 1950
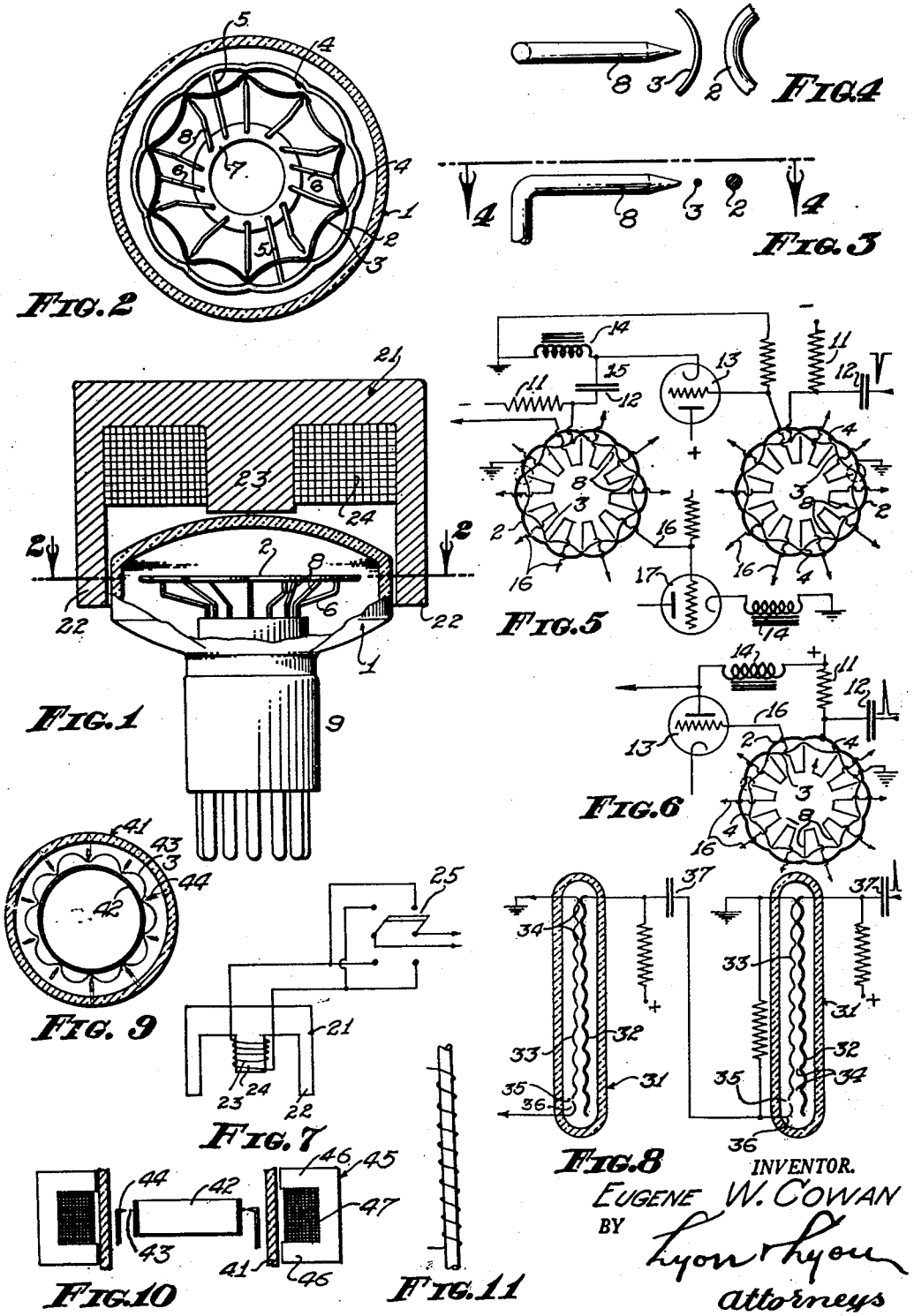
INVENTOR.
EUGENE W. COWAN
BY
Lyon & Lyon
Attorneys Patented Nov. 18, 1952

2,618,766

UNITED STATES PATENT OFFICE 2,618,766

IMPULSE COUNTER

Eugene W. Cowan, Pasadena, Calif., assignor to California Institute Research Foundation, Pasadena, Calif., a corporation of California Application December 18, 1950, Serial No. 201,457

16 Claims. (Cl. 315—166)

My invention relates to impulse counters; that is, to electronic devices for counting electrical impulses. Included in the objects of my invention are:

First, to provide an impulse counter which is particularly suitable for computing machines or applications requiring decimal or digital counters although its use is not limited thereto.

Second, to provide an impulse counter which employs a traveling glow discharge that is maintained rather than extinguished and remade between counts with the result that impulses spaced by as little as five micro-seconds may be counted whereas heretofore an impulse separation of approximately five hundred micro-seconds has been required.

Third, to provide an impulse counter which is particularly simple of construction and readily lends itself to a variety of electrode arrangements to meet different counting requirements.

Fourth, to provide an impulse counter which is readily adapted to various counter and computer circuits and which may be so arranged; for example, that one counter tube may count units, the next, tens, and the next, thousands, and, which when employed in such counter or computer circuits, reduces to a minimum the number of counter tubes required for a given range of operation.

Fifth, to provide an impulse counter which may be arranged to give a direct visual indication of the impulses.

Sixth, to provide an impulse counter which may be arranged to respond to either negative or positive impulses.

Seventh, to provide an impulse counter which may be caused to subtract as well as to add impulse counts by simple control of a magnetic field in which the counter is maintained.

With the above and other objects in view as may appear hereinafter, reference is directed to the accompanying drawings in which:

Figure 1 is a side, elevational view, partially in section of an electronic tube incorporating my impulse counter and showing in association therewith an electro-magnet to maintain a magnetic field.

Fig. 2 is a transverse, sectional view through 2—2 of Figure 1, the electromagnet being omitted.

Figure 3 is an exaggerated, sectional view through 3—3 of Figure 2 showing the electrode construction.

Figure 4 is a fragmentary plan view taken from the plane 4—4 of Figure 3.

Figure 5 is a fragmentary electrical circuit showing the manner in which my impulse counter may be used to count negative impulses.

Figure 6 is a similar circuit diagram showing my impulse counter arranged to count positive impulses.

Figure 7 is a simplified circuit incorporating the electromagnet for the purpose of illustrating the manner in which the impulse counter may be caused to subtract as well as add.

Figure 8 is a substantially diagramatic view of a simplified form of my impulse counter shown in a typical counting circuit, the counter here illustrated being particularly suitable for visual indication.

Figure 9 is a transverse sectional view similar to Figure 1 showing a modified form of my impulse counter.

Figure 10 is a transverse sectional view thereof showing in association therewith a modified form of electromagnet whereby the end of the counter tube may be viewed.

Figure 11 is a fragmentary view of a modified form of electrode which may constitute an anode or a cathode.

Reference is first directed to Figures 1–4, inclusive.

My impulse counter is encased in an envelope 1 containing an atmosphere suitable for maintenance of a glow discharge. Mounted in the envelope 1 is an anode ring 2 formed of a continuous loop of wire corrugated or undulated to form a plurality of inwardly directed peaks.

Within the anode ring 2 is a cathode ring 3 likewise formed of a continuous loop of wire and corrugated to form outwardly directed peaks which register with the inwardy directed peaks of the anode ring. The confronting peaks thus form a series of circumferentially separated throats or gaps 4 between which the anode and cathode spread apart.

The anode and cathode rings are maintained in a common plane by means of supports 5 and 6 which are secured in a suitable crush 7. Also supported by the crush 7 are auxiliary electrodes 8 which terminate in close proximity to the throats 4.

The size of the wire comprising the anode ring 2 is of relative unimportance. However, the wire comprising the cathode ring should be quite small; for example, in the range of .005 inch. The wire size of the auxiliary electrodes 8 is likewise unimportant except that their extremities should be pointed.

The envelope 1 is mounted in a conventional base 9 having a plurality of prongs or terminals 10. The terminals are electrically connected to the anode ring, cathode ring, and auxiliary electrodes. In the construction illustrated ten auxiliary electrodes are shown and the impulse counter is adapted for use in decimal counting systems.

Reference is now directed to Figure 5 in which there is illustrated fragmentarily an electronic circuit adapted to the use of my impulse counter. The counter tube is shown as arranged for decimal counting in which one tube counts units, the next tube, tens, and so on.

The anode ring 2 is grounded. The cathode wire is connected through a resistor 11 to a source of negative voltage of sufficient value to maintain a glow between a throat 4. The gas pressure in the tube should be about one to two cm. Hg; that is, the pressures commonly used in glow discharge tubes. Any of the inert gases used in conventional glow discharge tubes may be used. The impulse to be counted is introduced through a lead having a condenser 12 therein. The anode and cathode rings are exposed to a magnetic field which may be supplied from a permanent magnet or from an electro-magnet as will be described hereinafter.

Initially the glow may occur at any of the throats 4; however, by applying a voltage in excess of normal between the "zero" auxiliary electrode and the anode, the glow is caused to select the "zero" throat or gap. This provides a convenient means of "resetting" the counter tubes whenever desired.

By feeding impulses through the condenser 12, the glow is caused to jump from one throat to the next and will travel clockwise or counter clockwise depending upon the polarity of the magnetic field. One of the throats 4 is arbitrarily chosen as the "zero" point. Its auxiliary electrode is connected to the grid of a triode 13, the plate of which may be connected to a relay 14. The triode is so biased that it is non-conducting unless a glow occurs at the corresponding throat or gap 4. If it is desired to operate a second counter tube, a take-off lead 15 is connected to the plate of the triode 13. This lead connects through a condenser 12 to the cathode of the succeeding tube.

Each of the other auxiliary electrodes is connected by leads 16 to other triode tubes 17 which are likewise arranged so that they are normally non-conducting. The plate of each triode 17 may be connected to a suitable relay 14. It should be pointed out that devices other than relays operable by flow of current through the triode 13 or 17 may be used depending upon the purpose of the electronic circuit employed in association with the counter tube.

When a pulse of current flows through the tube, corresponding to the applied voltage pulse, the cathode glow spreads, since in a glow discharge the cathode current per unit area remains approximately constant. Under influence of a magnetic field perpendicular to the plane containing the anode and cathode wires, the glow tends to spread more in one direction than the other, and spreads from the initial throat or gap to the succeeding gap as determined by the magnetic field. When the pulse has subsided, the glow shrinks to its original dimensions, but remains at the succeeding throat or gap. By proper regulation of the size of the pulse the glow will jump one gap only with each pulse.

It has been found that the glow is not extinguished when it moves from throat to throat and that the movement takes place in less than five micro-seconds. Thus the impulses may be in the order of five micro-seconds without "over-running" the counter tube.

Reference is directed to Figure 6 in which the circuit is essentially the same as in Figure 5 except that the cathode 3 is grounded so that the auxiliary electrode raises the voltage of the grids of the triode tubes when a glow appears opposite the corresponding throats. The anode 2 of the counter tube is connected to a source of positive voltage as are also the plates of the triodes 13 or 17. Thus the triodes are normally conducting and are shut off upon occurrence of a glow at the corresponding throat 4.

Reference is now directed to Figure 7 as well as Figure 1. Mounted adjacent each counter tube is an electro-magnet 21 having an annular pole piece 22 encompassing the envelope 1 in or close to the plane anode or cathode rings and a central pole piece 23 located co-axially with respect to the anode and cathode rings. The magnet includes a solenoid 24. If it is desired merely to operate the tube for counting total impulses, the solenoid is continuously energized in a manner to cause rotation of the glow discharge in the desired direction. It should be observed that under this condition of operation a permanent magnet may be employed in place of an electro-magnet. However, if it is desired to change the direction of movement of the glow discharge, the polarity of the magnet is reversed by a suitable reversing switch such as indicated by 25. Reversal of the direction of movement of the glow discharge is desirable when the counter tube is used to subtract as well as add. Under these conditions the reversing switch or its equivalent electronic circuit is operated whenever reversal is required.

Reference is now directed to Figure 8. Here illustrated is a modified form of my counter tube in which the cathode and anode are arranged lineally. In this construction an envelope 31 is employed in which is mounted an anode 32 and a cathode 33, one or both of which are corrugated to form a series of throats 34. If an electro-magnet is used, the gaps at the throats 34 may be uniform. However, if the anode and cathode are arranged slightly divergent, the magnetic field may be omitted. In the illustration shown, eleven throats are shown. However, the cathode is separated by a small gap 35 just before the eleventh throat to form an auxiliary electrode 36.

One application of this tube involves a circuit in which the cathode is grounded and the auxiliary electrode 36 is connected through a suitable condenser 37 to the anode of the succeeding tube. In the use of eleven gaps, the first ten would correspond to the numerals zero to nine inclusive, the throat opposite zero being the closest.

Upon feeding impulses to the tube shown in Figure 8, the glow discharge first appears opposite the "zero" throat, and will progress on succeeding impulses until it reaches the gap 35. As the glow attempts to jump to the following throat it is extinguished by the high resistance, and the resultant rise in voltage furnishes a positive impulse to the next counter tube. The glow in the first tube immediately re-forms at the zero position and the glow in the succeeding tube has advanced one throat. It is, of course, obvious that auxiliary electrodes as in the first described structure may be placed opposite the plates of the throats 34 shown in Figure 8 and that a magnetic field may be employed to control the direction of movement of the glow discharge.

Reference is directed to Figures 9 and 10. The impulse counter here illustrated is circular as in the first described construction. The envelope 41 encloses an anode ring 42 which is here shown as a metal band. Within or outside, in this case outside the ring 42 is a cathode ring 43 having corrugations to form a series of wide and narrow throats. Auxiliary electrodes 44 are shown similar to the auxiliary electrodes 8.

The counter tube 41 may be provided with an electromagnet as shown in Figure 1, or may be provided with the type shown in Figure 10 and designated 45. This arrangement includes internal flanges 46 and a coil 47. As in the first described structure the magnet 45 may be a permanent magnet instead of an electromagnet.

Reference is directed to Figure 11. Here an anode or cathode wire 51 is shown wrapped about a mandrel of insulating material such as glass. Either or both the anode or cathode may be so arranged and when placed side-by-side as in Figure 8 and the convolutions form, in effect, the undulations provided in the preceding structures.

It should be observed that either or both anode and cathode may be undulated or corrugated and the anode may be a wire or sheet metal. Also, several sets of anodes and cathodes may be arranged in stages within a single envelope, providing, of course, that the necessary circuit components are connected between the different stages. The circular anodes and cathodes may be stacked; whereas, the lineal anodes and cathodes may be arranged side by side to form columns and rows, so that extremely large numbers may be indicated in a small area. For example, ten units of the type shown in Figure 8 would permit counts to the tenth power of ten.

Having thus described certain embodiments and applications of my invention, I do not desire to be limited, but intend to claim all novelty inherent in the appended claims.

I claim:

1. An impulse counter, involving: an anode member and a cathode member subjected to an atmosphere and a reduced pressure suitable for establishment of a glow discharge; said members being shaped to provide a series of narrow gaps and spread apart from each other between said gaps whereby a glow discharge tends to form in the region of any of said gaps, upon application of a predetermined voltage between said anode and cathode members; and a plurality of auxiliary electrodes disposed adjacent said cathode wire in the regions of said narrow gaps.

2. An impulse counter, involving: an anode member and a cathode member subjected to an atmosphere and a reduced pressure suitable for establishment of a glow discharge; said members being shaped to provide a series of narrow gaps and spread apart from each other between said gaps whereby a glow discharge tends to form in the region of any of said gaps, upon application of a predetermined voltage between said anode and cathode members; and means for establishing a magnetic field having a component perpendicular to said anode and cathode members.

3. An impulse counter, involving: an anode wire and a cathode wire subjected to an atmosphere and a reduced pressure suitable for establishment of a glow discharge; said wires being shaped to provide a series of narrow gaps and spread apart from each other between said gaps whereby a glow discharge tends to form in the region of any of said gaps, upon application of a predetermined voltage between said anode and cathode wires; and means for establishing a magnetic field having a component perpendicular to said anode and cathode wires; and a plurality of auxiliary electrodes disposed adjacent said cathode wire in the regions of said narrow gaps.

4. An impulse counter, involving: an anode wire and a cathode wire relatively undulated to provide a series of narrow and wide gaps, said wires exposed to an atmosphere of inert gas at such pressure as to maintain a glow discharge at any of said narrow gaps upon application of a predetermined voltage; and means for establishing a magnetic field in the area of said anode and cathode wires; and whereby on application of a series of pulses applied said anode and cathode wires in addition to said predetermined voltage, said glow is urged progressively from one narrow gap to the next.

5. An impulse counter, involving: an anode wire and a cathode wire relatively undulated to provide a series of narrow and wide gaps; said wires exposed to an atmosphere of inert gas at such pressure as to maintain a glow discharge at any of said narrow gaps upon application of a predetermined voltage; and means for establishing a magnetic field in the area of said anode and cathode wires; and whereby on application of a series of pulses applied said anode and cathode wires in addition to said predetermined voltage, said glow is urged progressively from one narrow gap to the next; and means for controlling the direction of said magnetic field, thereby to control the direction of movement of said glow discharge.

6. An impulse counter, involving: an anode wire and a cathode wire relatively undulated to provide a series of narrow and wide gaps; said wires exposed to an atmosphere of inert gas at such pressure as to maintain a glow discharge at any of said narrow gaps upon application of a predetermined voltage; and means for establishing a magnetic field in the area of said anode and cathode wires; and whereby on application of a series of pulses applied said anode and cathode wires in addition to said predetermined voltage said glow is urged progressively from one narrow gap to the next; and a plurality of auxiliary electrodes disposed adjacent said cathode wire in the regions of said narrow gaps.

7. An impulse counter; involving: an anode wire and a cathode wire relatively undulated to provide a series of narrow and wide gaps; said wires exposed to an atmosphere of inert gas at such pressure as to maintain a glow discharge at any of said narrow gaps upon application of a predetermined voltage; and means for establishing a magnetic field in the area of said anode and cathode wires; and whereby on application of a series of pulses applied said anode and cathode wires in addition to said predetermined voltage, said glow is urged progressively from one narrow gap to the next; and means for controlling the direction of said magnetic field, thereby to control the direction of movement of said glow discharge; and a plurality of auxiliary electrodes disposed adjacent said cathode wire in the regions of said narrow gaps.

8. An impulse counter, involving: an anode loop and a cathode loop relatively undulated to form an endless series of narrow gaps and wide gaps, said loops being exposed to an atmosphere and at a pressure conducive to the formation of a glow discharge at any of said narrow gaps upon application of a predetermined voltage; and means for establishing a magnetic field in the region of said loops, whereby on application of a predetermined change in voltage pulse, said glow discharge is caused to move in succession from one narrow gap to the next.

9. An impulse counter, involving: an anode loop and a cathode loop relatively undulated to form an endless series of narrow gaps and wide gaps, said loops being exposed to an atmosphere and at a pressure conducive to the formation of a glow discharge at any of said narrow gaps upon application of a predetermined voltage; and a plurality of auxiliary electrodes disposed adjacent said narrow gaps to detect the presence of a glow at a corresponding gap.

10. An impulse counter, involving: a circular anode wire and a circular cathode wire relatively undulated to form an annular series of narrow gaps and wide gaps, said wires being exposed to an atmosphere and at a pressure conducive to the formation of a glow discharge at any of said narrow gaps upon application of a predetermined voltage; and means for establishing a magnetic field in the region of said wires, whereby on application of a predetermined change in voltage pulse, said glow discharge is caused to move in succession from one narrow gap to the next; and a plurality of auxiliary electrodes disposed adjacent said narrow gaps to detect presence of a glow at a corresponding gap.

11. An impulse counter, involving: a series of counter units each including an anode member and a cathode member, and an auxiliary electrode; the anode member and cathode member of each counter unit being relatively undulated to provide a series of narrow gaps separated by wide gaps, each counter unit being established in an atmosphere at such pressure as to produce a glow discharge at any of said narrow gaps upon application of a predetermined voltage across said anode and cathode members; means for causing said glow discharge to jump in a predetermined direction from one narrow gap to the next upon superimposing pulses on said predetermined voltage; said auxiliary electrode of one counter unit being electronically coupled to the anode member of a succeeding counter unit to transmit a pulse whenever the glow discharge occurs in the region of said auxiliary electrode.

12. An impulse counter as set forth in claim 11 wherein: said anode and cathode members are arranged in a loop to provide a ring of narrow gaps.

13. An impulse counter as set forth in claim 11 wherein: said anode and cathode members are columnar and said auxiliary electrode is at one extremity of said cathode member.

14. An impulse counter as set forth in claim 11 wherein: additional auxiliary electrodes are provided opposite each of said narrow gaps to detect the location of said glow discharge at it moves from one narrow gap to the next.

15. An impulse counter as set forth in claim 11 wherein: said means for progressing said glow discharge is a magnetic field.

16. An impulse counter as set forth in claim 11 wherein: said anode wire and cathode members diverge whereby said narrow gaps progressively increase and such diverging relation of the anode and cathode members constitutes said means for causing progression of said glow discharge.

EUGENE W. COWAN.

REFERENCES CITED

The following references are of record in the file of this patent:

UNITED STATES PATENTS

| Number | Name | Date |
|---|---|---|
| 2,517,599 | Reeves | Aug. 8, 1950 |
| 2,524,213 | Wales | Oct. 3, 1950 |